United States Patent
Mishra et al.

(10) Patent No.: US 10,645,967 B2
(45) Date of Patent: May 12, 2020

(54) SHELF-STABLE ACIDIFIED AERATED FOOD EMULSION

(71) Applicant: The Clorox Company, Oakland, CA (US)

(72) Inventors: Ritu Mishra, Pleasanton, CA (US); Abril Estrada, Pleasanton, CA (US); Clarissa Koga, Pleasanton, CA (US); Perry Nga, Pleasanton, CA (US); Hubert Chan, Pleasanton, CA (US); Edith Ramos da Conceicao Neta, Pleasanton, CA (US); Joanna L. Oldaker, Pleasanton, CA (US); Vidya Ananth, Pleasanton, CA (US); Maria G. Ochomogo, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 96 days.

(21) Appl. No.: 15/671,914

(22) Filed: Aug. 8, 2017

(65) Prior Publication Data

US 2019/0045832 A1  Feb. 14, 2019

(51) Int. Cl.
| | |
|---|---|
| A23P 30/40 | (2016.01) |
| A23D 7/01 | (2006.01) |
| A23D 7/005 | (2006.01) |
| A23L 27/00 | (2016.01) |
| A23L 27/60 | (2016.01) |
| A23D 7/00 | (2006.01) |

(52) U.S. Cl.
CPC .............. *A23P 30/40* (2016.08); *A23D 7/003* (2013.01); *A23D 7/0053* (2013.01); *A23D 7/0056* (2013.01); *A23D 7/011* (2013.01); *A23D 7/013* (2013.01); *A23L 27/60* (2016.08); *A23L 27/80* (2016.08); *A23V 2002/00* (2013.01)

(58) Field of Classification Search
CPC .... A23D 7/003; A23D 7/0053; A23D 7/0056; A23D 7/011; A23D 7/013; A23L 27/60; A23L 27/80; A23P 30/40
USPC ................................................. 426/564, 568
See application file for complete search history.

(56) References Cited

U.S. PATENT DOCUMENTS

| | | | |
|---|---|---|---|
| 3,968,261 | A | 7/1976 | Goodman |
| 4,089,967 | A | 5/1978 | Chang |
| 4,420,495 | A | 12/1983 | Josef et al. |
| 4,578,278 | A | 3/1986 | Giddey et al. |
| 6,203,841 | B1 | 3/2001 | Lynch et al. |
| 6,475,551 | B2 | 11/2002 | Nozaki |
| 7,468,395 | B2 | 12/2008 | Kolke et al. |
| 7,563,470 | B2 | 7/2009 | Joseph et al. |
| 7,776,376 | B2 | 8/2010 | Perks et al. |
| 8,252,358 | B2 | 8/2012 | Piatko et al. |
| 8,603,559 | B2 | 12/2013 | Perks et al. |
| 8,647,695 | B2 | 2/2014 | Arnaudov et al. |
| 8,647,696 | B2 | 2/2014 | Norton et al. |
| 8,993,030 | B2 | 3/2015 | Aldred et al. |
| 9,351,500 | B2 | 5/2016 | Ketchmark et al. |
| 2007/0003681 | A1 | 1/2007 | Kim |
| 2010/0112147 | A1* | 5/2010 | Barnard ................ A23C 9/1544 426/130 |
| 2010/0221392 | A1 | 9/2010 | Nakai et al. |
| 2011/0256296 | A1 | 10/2011 | Thorson et al. |
| 2012/0021106 | A1 | 1/2012 | Burmester et al. |
| 2013/0344227 | A1 | 12/2013 | Quigley |
| 2014/0127379 | A1* | 5/2014 | Mishra ................ A23D 7/0053 426/582 |
| 2014/0170289 | A1 | 6/2014 | Piatko et al. |

FOREIGN PATENT DOCUMENTS

| | | |
|---|---|---|
| JP | 61054230 A * | 3/1986 |
| WO | 200038547 A1 | 7/2000 |
| WO | 200219850 A2 | 3/2002 |
| WO | 201293709 A1 | 7/2012 |
| WO | 2014173416 A2 | 10/2014 |
| WO | 201649577 A1 | 3/2016 |

* cited by examiner

*Primary Examiner* — Jyoti Chawla
(74) *Attorney, Agent, or Firm* — Ann Lee

(57) ABSTRACT

Packaged aerated acidified food compositions (e.g., aerated dips, sauces, etc.) having a low density (e.g., 0.4 to 0.8 g/cm$^3$) due to incorporation of gas bubbles (e.g., nitrogen or air) within an aerated matrix. In addition to the aerated matrix the composition further includes a relatively high fraction of oil (e.g., as an oil/water emulsion). The compositions are shelf-stable, so as to exhibit microbial stability and stability with respect to the aerated low density "whipped" texture, without requiring refrigeration. The composition includes the aerating gas (e.g., nitrogen or air), a protein (e.g., soy or dairy), a stabilizer (e.g., a hydrocolloid, a cyclodextrin, a monoglyceride, and/or a diglyceride), oil, water, an emulsifier, and a food grade acid. Flavors, spices, and other components may be included.

16 Claims, No Drawings

SHELF-STABLE ACIDIFIED AERATED FOOD EMULSION

BACKGROUND OF THE INVENTION

1. The Field of the Invention

The present invention relates to packaged aerated and emulsified food compositions (e.g., oil and water "whipped" dips, dressings, creams, spreads, toppings, sauces, and similar foods) exhibiting extended shelf-stability without requiring refrigeration.

2. Description of Related Art

Many consumers enjoy salad dressings, dips, creams, and similar food items. Typically, such food compositions are carefully formulated not only in terms of the edible components included therein to provide great taste, but other characteristics, such as pH, rheology, stability, and other factors that are carefully controlled to ensure characteristics other than taste are as desired. At the same time, there is an increased awareness by consumers of label ingredients included within such formulations, and a desire to avoid certain components that may be harmful, or perceived as harmful. Finally, there is a desire among some consumers for food compositions that would exhibit a "whipped" or aerated low density texture. Because of the many constraints applicable to such food compositions, it can be very difficult to provide a food composition having a desired texture, great taste, and extended shelf-stability all at the same time.

BRIEF SUMMARY

One aspect of the present invention relates to shelf-stable acidified aerated food compositions. Such compositions may exhibit a "whipped" aerated texture, having a relatively low density, and may advantageously not require refrigeration in order to maintain stability over an extended period of time. The terms aerated, whipped, foamed, and the like may be used interchangeably herein. For example, such food compositions may be provided as aerated dips, aerated dressings, aerated cream sauces, aerated spreads, or other aerated toppings or aerated sauces. The ability to provide such low density, aerated food compositions that are shelf-stable (e.g., for at least 1 month, at least 3 months, at least 6 months, at least 12 months, or at least 18 months) without requiring refrigeration is particularly advantageous. By "shelf-stable" it is meant that the packaged food product composition may remain stable such that it does not spoil (i.e., microbial stability), and it substantially maintains its aerated low density texture for the given shelf-life. No refrigeration of the food composition is required to achieve such results. Nor is hot-packing of the composition typically required.

One embodiment is directed to a shelf-stable acidified aerated food composition comprising (a) protein (e.g., dairy or soy), (b) a stabilizer (e.g., one or more of mono- or diglycerides, a cyclodextrin, or a hydrocolloid), (c) oil, (d) water, and (e) a food grade acid. At least the oil and water may be present as an oil/water emulsion. The composition may have a density of not more than 0.8 g/cm³, and the composition may be shelf-stable for a period of at least 1 month without requiring refrigeration.

Water may also typically be present. Aeration of at least a part of the composition may be achieved with a gas (e.g., injected nitrogen or air) to decrease the density. In addition to the protein, stabilizer, and hydrocolloid, the composition may further include oil, water, and a food grade acid. The pH of the shelf-stable acidified aerated food composition has a pH of less than 4, and a density of not more than 0.8 g/cm³.

One embodiment of the invention relates to a process for producing a shelf-stable acidified aerated food composition. Such a process may include (a) providing one or more of the above components, and (b) aerating one or more such components to yield the shelf-stable acidified aerated food composition, where the food composition has a density of not more than 0.8 g/cm³. Aeration may be accomplished by injecting or otherwise introducing nitrogen gas, air, or another suitable gas.

The order of addition of the components can be important to achieving the desired aerated characteristics. For example, the inventors have discovered that the food grade acid used to acidify the composition should be added after aeration, as the presence of acid can interfere with the ability to form the desired whipped or foamed texture. Similarly, in at least some embodiments, aeration may occur without the presence of any significant oil fraction, as oil can interfere with the ability to achieve the desired "airy" whipped or foamed texture. In some embodiments, a small fraction of glycerides (e.g., mono- and/or diglycerides, and/or triglyceride palm oil (technically a solid fat which melts at 75° F.)) may be present in the composition being aerated, as a stabilizer, although little if any triglyceride oils are typically present within the composition at aeration. That said, triglyceride oil does make up a significant fraction of the finished product. It will thus be appreciated that order of addition can be important to achieving the final desired characteristics.

Further features and advantages of the present invention will become apparent to those of ordinary skill in the art in view of the detailed description of preferred embodiments below.

DETAILED DESCRIPTION OF THE PREFERRED EMBODIMENTS

I. Definitions

Before describing the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "comprising" which is synonymous with "including," "containing," or "characterized by," is inclusive or open-ended and does not exclude additional, unrecited elements or method steps.

The term "consisting essentially of" limits the scope of a claim to the specified materials or steps "and those that do not materially affect the basic and novel characteristic(s)" of the claimed invention.

The term "consisting of" as used herein, excludes any element, step, or ingredient not specified in the claim.

It must be noted that, as used in this specification and the appended claims, the singular forms "a," "an" and "the"

include plural referents unless the content clearly dictates otherwise. Thus, for example, reference to "an oil" includes one, two or more such oils.

Unless otherwise stated, all percentages, ratios, parts, and amounts used and described herein are by weight.

Numbers, percentages, ratios, or other values stated herein may include that value, and also other values that are about or approximately the stated value, as would be appreciated by one of ordinary skill in the art. A stated value should therefore be interpreted broadly enough to encompass values that are at least close enough to the stated value to perform a desired function or achieve a desired result, and/or values that round to the stated value. The stated values include at least the variation to be expected in a typical formulation process, and may include values that are within 10%, within 5%, within 1%, etc. of a stated value. Furthermore, the terms "substantially", "similarly", "about" or "approximately" as used herein represent an amount or state close to the stated amount or state that still performs a desired function or achieves a desired result. For example, the term "substantially" "about" or "approximately" may refer to an amount that is within 10% of, within 5% of, or within 1% of, a stated amount or value.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. Any numerical value, however, inherently contains certain errors necessarily resulting from the standard deviation found in their respective testing measurements.

Some ranges may be disclosed herein. Additional ranges may be defined between any values disclosed herein as being exemplary of a particular parameter. All such ranges are contemplated and within the scope of the present disclosure.

The term "food safe" refers to compositions, which are comprised entirely of materials that are considered food grade, and/or Generally Recognized As Safe (GRAS) and/or Everything Added to Food in the U.S. (EAFUS). In the United States, ingredients pre-approved for food use are listed in the United States Code of Federal Regulations ("C.F.R."), Title 21. Food safe materials may also include ingredients that are well established as safe, have adequate toxicological and safety pedigree, can be added to existing lists, or approved via a self-affirmation process.

In the application, effective amounts are generally those amounts listed as the ranges or levels of ingredients in the descriptions, which follow hereto. Unless otherwise stated, amounts listed in percentage ("%'s") are in weight percent (based on 100% active) of the food product composition.

The phrase 'free of' or similar phrases as used herein means that the composition comprises 0% of the stated component, that is, the component has not been intentionally added to the composition. However, it will be appreciated that such components may incidentally form, under some circumstances, as a byproduct or a reaction product from the other components of the composition, or such component may be incidentally present within an included component, e.g., as an incidental contaminant.

The phrase 'substantially free of' or similar phrases as used herein means that the composition preferably comprises 0% of the stated component, although it will be appreciated that very small concentrations may possibly be present, e.g., through incidental formation, as a byproduct or a reaction product from the other components of the composition, incidental contamination, or even by intentional addition. Such components may be present, if at all, in amounts of less than 1%, less than 0.5%, less than 0.25%, less than 0.1%, less than 0.05%, less than 0.01%, less than 0.005%, or less than 0.001%.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

II. Introduction

In an aspect, the present invention is directed to dips, dressings, sauces, spreads, toppings, and the like that are aerated so as to provide a light "whipped" texture incorporating gas bubbles, while at the same time providing the packaged food product compositions with shelf-stability so that they maintain freshness and their aerated texture, even when stored in a manner as consumers and retailers are accustomed to, e.g., placing it on a shelf, unrefrigerated, for a period of weeks, months, or even up to a year or more.

The present inventors have surprisingly found that such characteristics are possible as described herein. Such a food composition advantageously is shelf-stable so as to exhibit microbial stability (i.e., it does not spoil) as well as stability of the aerated low density texture (e.g., density does not increase by more than 25%, more than 20%, more than 15%, more than 10%, more than 5%, or more than 5%) even in unrefrigerated conditions for a period of at least 1 month, at least 3 months, at least 6 months, at least 12 months, or at least 18 months. The density is maintained within a desired range e.g., of no more than 0.8 g/cm$^3$ (e.g., from 0.4 g/cm$^3$ to 0.8 g/cm$^3$). The acidified aerated food product composition may typically exhibit an overrun (i.e., increase in volume due to aeration) of 40-110%.

III. Exemplary Acidified Aerated Food Product Compositions

A. Protein

Embodiments of the present food product compositions include a protein and a stabilizer which provide the aerated structure in which tiny air or other gas bubbles can be maintained. The protein may advantageously be a dairy protein, or plant protein. Combinations thereof may also be possible. The protein provides a thin film around which the gas bubbles can be maintained, resulting in an overall aerated or whipped texture to the food product composition. Suitable protein sources that may be used include full dairy protein, or more isolated forms of dairy protein, such as casein protein or whey protein. Plant protein sources may additionally or alternatively be used. Examples of plant protein sources include, but are not limited to soy protein, protein derived from algae sources, or derived from various legumes, e.g., from peas. Any such protein may be modified, so as to be derived from any of the above, as will be appreciated by those of skill in the art. Combinations of various proteins may be used.

The present food product compositions advantageously are able to maintain the desired aerated texture at relatively low fractions of protein. For example, while many other aerated food compositions based on aeration using protein are believed to have protein content that may be greater than 6% by weight, the present compositions may have far lower protein content, e.g., less than 5% by weight, less than 4% by weight, or less than 3% by weight (e.g., from 0.2% to 3%, or from 2% to 3% by weight of the final composition), depending on type used, as shown in the Examples included herein. The ability to provide and maintain the aerated, "whipped" or "foamed" texture with such low protein fractions is advantageous and surprising.

B. Stabilizers

In addition to the protein component, the food product composition further includes a stabilizer. Such stabilizer serves to stabilize the aerated, whipped texture provided by the protein which forms the thin film structure around the gas bubbles. Suitable stabilizers include monoglycerides, diglycerides, and combinations thereof (e.g., lactic acid esters of mono/di glyceride fatty acids). Cyclodextrins are also suitable for use as stabilizers. Phosphate stabilizers may also be suitable for use. Various other food grade stabilizers may be apparent to those of skill in the art, and are within the scope of the present invention. The amount of the stabilizer is relatively low, e.g., less than 5% by weight, less than 4% by weight, or less than 3% by weight (e.g., from 0.2% to 3%, or from 2% to 3% by weight of the final composition), depending on type used, as shown in the Examples included herein. Even with such relatively low fractions of stabilizer, it is possible to maintain the desired aerated texture within the composition over a given shelf-life of the composition, e.g., at least 1 month, at least 3 months, or even far longer, such as at least 6 months, at least 12 months, or even at least 18 months.

Hydrocolloids may also be suitable for use to aid in stabilization. Examples of hydrocolloids include various starches and/or gums, such as, but not limited to xanthan gum, guar gum, carrageenan, agar, locust bean gum, cellulose, alginate, corn starch, other starches, and combinations thereof. The amount of the hydrocolloid included in the composition as a whole may be less than 5% by weight, less than 4% by weight, less than 3% by weight, less than 2% by weight, or even less than 1% by weight. Such gums and starches are useful in increasing the viscosity of the composition, which increased viscosity also aids in maintaining the desired aerated texture for an extended period of time, as described herein. For example, the composition may have a viscosity of at least 1,000 cps, at least 3,000 cps, at least 5,000 cps, from 3,000 cps to 15,000 cps, or from 5,000 cps to 12,000 cps (e.g., as measured using a Brookfield viscometer at a shear rate of 50 rpm).

Water may also of course be included within the food product composition. Water may comprise at least 50%, at least 55%, at least 60%, or from 60% to 80% of the composition at the time of aeration. Water may comprise at least 20%, at least 25%, at least 30%, from 20% to 75%, from 25% to 65%, or from 30% to 60% of the finished acidified aerated food product composition.

Other exemplary components that may be included as desired include, salt, sugar, preservatives, flavors, spices, and the like. Some such components may aid in regulation of water activity.

These components of the composition before aeration may have a relatively high density, e.g., greater than 0.8 g/cm$^3$, greater than 0.85 g/cm$^3$, typically from 0.9 g/cm$^3$ to 1.1 g/cm$^3$. The composition to be aerated may be aerated by any suitable mechanism in order to create a desired aerated, foamed or whipped low density texture in which an injected gas (e.g., nitrogen and/or air) forms bubbles therein, which bubbles are supported or maintained by formation of a thin protein film around the gas bubble, which maintains the bubble, preventing collapse thereof. Any of various suitable structures may be used to inject the gas into the composition being aerated. For example, an in-line gas injector such as those available from PICK-HEATER may be suitable for use. The particular structure employed for introduction of the bubbles is not particularly limited, and a wide variety of structures capable of aerating the composition (e.g., by injecting a desired gas) may be suitable for use. Various examples of such will be apparent to those of skill in the art, in light of the present disclosure. While the composition as aerated may be aerated to any desired degree to provide any density that is less than that before aeration, the after aeration density may typically be from 0.05 g/cm$^3$ to 1 g/cm$^3$, from 0.25 g/cm$^3$ to 0.8 g/cm$^3$, or from 0.35 g/cm$^3$ to 0.6 g/cm$^3$.

Advantageously, no or minimal acidic components are included in the composition at the time of aeration. The present inventors have discovered that addition of acid, particularly acid in a concentrated form, results in complete or partial collapse of the desired foamed or whipped structure, or the inability to effectively aerate such a composition, if the acid is already present in the composition prior to aeration. For this reason, the acid used to acidify the food composition may advantageously be added later.

Similarly, little if any oil or fats may be present at the time of aeration. For example, the composition being aerated may be free of oils (or fats) other than a small fraction of stabilizer, where the stabilizer may be a combination of glycerides, as noted above, and shown in the below Examples. The presence of significant fractions of oils (particularly liquid oils) within the composition to be aerated may otherwise interfere with the ability to achieve the desired aerated, low density texture.

As noted above, water may comprise the majority of the composition at aeration. For example, water may typically comprise from 60% to 80% of the composition being aerated, by weight. All weight percentages may be referenced to the components of the given composition, excepting the gas used for aeration (the weight of which is negligible). The pH of the composition at aeration may be slightly acidic, e.g., from 5 to 7, from 5.5 to 7, or from 6 to 7 (e.g., from 6 to 6.5). It may also be possible to formulate a composition to be aerated that would alternatively be basic in pH (i.e., greater than pH of 7). For example, such may occur where a carbonate (e.g., calcium carbonate) or another basic component may be present in the composition being aerated. As will be explained in further detail below, the finished food product composition may have a relatively acidic pH, e.g., less than 5, less than 4, from 3 to 4, from 3 to 3.8, or from 3.3 to 3.6.

C. Oil and Acid

The food product composition further includes an oil (which may be emulsified with water). One or more emulsifiers (e.g., egg, egg yolk, egg white, lecithin, monoglycerides, diglycerides, polysorbate, or the like) may also be present.

The food product composition includes a food grade acid. It is important that such acid be added after aeration. For example, the inventors have discovered that concentrated acid addition to the aerated composition can cause the desired aerated, whipped or foamed texture to quickly collapse. Further, it was found that if aeration is attempted on an already acidified composition, no significant aeration occurs, as the presence of the acid inhibits any substantial aeration from occurring. The inventors found that it was possible to form the acidified, aerated food product by adding the acid after aeration. Such ability to provide a product which is moderately acidic (e.g., pH less than 4) and at the same time aerated was surprising and unexpected.

Exemplary acids include soluble, partially soluble, sparingly soluble, and substantially insoluble mineral and organic acids, including combinations of acids. Corresponding conjugate acid salts of such acids may also be suitable, including, but not limited to mono-carboxylic acids, di-carboxylic acids, tri-carboxylic acids, nitrogen based acids, and combinations thereof. Specific examples of such edible food grade acids include phosphoric acid, citric acid (e.g., lemon juice), acetic acid (e.g., vinegar), malic acid, gluconic acid, lactic acid, fumaric acid, propionic acid, succinic acid, tartaric acid, glucono delta lactone (a lactone of D-gluconic acid), or hydrochloric acid, derivatives or isomers of any of the foregoing, conjugate salts thereof, or combinations thereof. In some embodiments, acetic acid (vinegar), citric acid (lemon juice), and/or phosphoric acid may be the only added acid(s) (e.g., the composition may be free of one or more of lactic acid, other organic acids, or other mineral acids). While fatty acid structures are of course present in the composition (e.g., mainly as glycerides), their effect on pH is minimal compared to that of the food grade acid component, which if an organic acid, typically has 8 or less carbon atoms. The fatty acid structures typically have significantly longer carbon chain lengths.

The amount of acid (e.g., citric acid and acetic acid) may be from 0.1% to 10%, from 0.1% to 5%, from 0.5% to 5%, from 0.5% to 4%, or from 1% to 3% of the composition as whole. The aerated acidified food product may have a pH of less than 4, e.g., from 3.3 to 3.6, as described above. The target low pH may be an important characteristic in providing microbial stability, without requiring refrigeration.

The oil component advantageously may comprise a native vegetable oil as harvested from the plant source, without having undergone any chemical changes. For example, while ice-creams and the like of U.S. Pat. No. 7,468,395 may separate the fatty acid chains from such a vegetable oil, and then esterify such fatty acids with glycerol in order to engineer the monoglyceride, diglyceride, and triglyceride balance of the resulting material, in at least some embodiments, no such chemical modification is done in the present invention. For example, preferably, the vegetable oil is used in a substantially native form, without any significant engineering to alter the natural balance of the glyceride components in the natural vegetable oil. For example, while processes such as those described in U.S. Pat. No. 7,468,395 may not be employed, the native soybean or other oil employed in the present invention may be "winterized", by processing through a series of cooling steps to remove fatty components with relatively high melting points. Such "wintering" is permissible and within the scope of the present invention. In an embodiment, nearly all of the vegetable oil may comprise triglycerides. Furthermore, the vegetable oil may be liquid, rather than a solid "fat" at ambient temperature (e.g., the vegetable oil may have a melting temperature that is less than ambient temperature (e.g., ~70° F.).

While ice creams and similar compositions such as that of U.S. Pat. No. 7,468,395 may include a large fraction of solid "fats", such as solid triglycerides having melting temperatures higher than ambient temperature, to aid in the ability to incorporate higher concentrations of oil into the composition, the present invention, in at least one embodiment, includes little or no such solid "fats" that would have melting temperatures greater than ambient temperature. The oil of any oil/water emulsion of the present composition may be free or substantially free of such components. More particularly, the overall composition may be substantially free of such components, e.g., but for inclusion of a small fraction of monoglyceride and/or diglyceride stabilizer components, and/or palm oil, where such a stabilizer is used, which components may technically have a melting point greater than ambient temperature. While potentially present, such glycerides are not typically emulsified in an oil/water emulsion, but serve as stabilizers for the protein, stabilizing the aerated structure of the aerated food composition. Furthermore, such components comprise less than 5%, less than 4%, less than 3% or less than 2% of the composition as a whole. For example, an exemplary stabilizer may include a mixture of dairy protein and stabilizers. Palm oil may be present, e.g., comprising 20-40% by weight of the stabilizer. Lactic acid esters of mono- and diglycerides of fatty acids may comprise 10-20% by weight of the stabilizer. By way of example, the stabilizer may only be included in an amount of 2.4% by weight, such that palm oil comprises 0.48% to 0.96% of the composition, while the mono- and diglycerides of the stabilizer only comprise 0.24% to 0.48% by weight of the composition.

For example, native soybean oil and other native vegetable oils may typically consist essentially of triglycerides, with a very small fraction of diglycerides and/or free fatty acids. For example, the triglyceride fraction of soybean or another vegetable oil may be about 99% or more triglycerides, up to about 1% diglycerides, and up to about 0.1% free fatty acids. The fatty acid chains of such triglycerides vary somewhat from vegetable oil to vegetable oil, although the unsaturated fatty acids linoleic acid, oleic acid, and linolenic acid are typically present, particularly in soybean oil. In some embodiments, a significant fraction of the fatty acid chains of triglycerides of the vegetable oil are unsaturated (e.g., monounsaturated or polyunsaturated). For example, at least 80% of the fatty acid chains may be unsaturated. Of the above mentioned fatty acids, linolenic acid and linoleic acid are polyunsaturated, while oleic acid is monounsaturated. Preferably, the oil is free, or substantially free (e.g., less than 1%, if any), of trans fats, so that any unsaturated fatty acids are of the cis configuration.

Any suitable edible oils may be used, e.g., such as triglyceride oils derived from seeds, for example, soybean oil, safflower oil, canola oil, corn oil, olive oil, sesame oil, cottonseed oil, flaxseed oil, sunflower oil, peanut oil, or the like. Mixtures of any such oils may be used. Various exemplary vegetable oils, and exemplary compositions thereof are shown in Table 1 below. It will be appreciated that the compositions shown are merely exemplary, and that the exact composition of any given vegetable oil may vary somewhat, e.g., depending on environmental factors relative to the plant from which the oil is harvested. It will also be readily apparent that the fraction of monounsaturated and polyunsaturated components as compared to saturated fatty acid components may vary widely depending on the particular oil or oils selected.

In an embodiment, the fraction of saturated fatty acid components in the oil may be from 3% to 50% by weight, from 5% to 40% by weight, or from 10% to 20% by weight. The fraction of unsaturated fatty acid components in the oil may be at least 70%, at least 80%, from 70% to 95% by weight, from 75% to 95% by weight, or from 80% to 95% by weight. The fraction of monosaturated fatty acid components in the oil may be from 5% to 90% by weight, from 10% to 80% by weight, or from 20% to 50% by weight. The fraction of polysaturated fatty acid components in the oil may be from 5% to 90% by weight, from 10% to 80% by weight, or from 20% to 70% by weight. The fraction of free fatty acids in the oil may be less than 1%, less than 0.5%, less than 0.1%, e.g., about 0.05%, if any is present at all. The fraction of mono- or diglyceride components in the oil may be less than 5%, less than 4%, less than 3%, less than 2%, less than 1%, less than 0.5%, less than 0.25%, or less than 0.1% by weight.

While in some embodiments mono- and diglycerides (e.g., lactic acid esters) may be present as a stabilizer, and some palm oil triglycerides may be present, such mono- and diglycerides may be limited to no more than 1%, no more than 0.5%, or from 0.05% to 1% by weight of the composition as a whole. Palm oil may be limited to no more than 2%, no more than 1%, or from 0.1% to 2% by weight of the composition as a whole for the reasons described above.

TABLE 1

| Vegetable Oil | Saturated Fatty Acids | Unsaturated Fatty Acids |
|---|---|---|
| Soybean Oil | 14% saturated | 81% unsaturated |
| | 10% palmitic acid (16:0) | 51% linoleic (18:2 n-6) |
| | 4% stearic (18:0) | 23% oleic (18:1 n-9) |
| | | 7% linolenic (18:3 n-3) |
| Canola Oil | 6% saturated | 92% unsaturated |
| | 4% palmitic acid (16:0) | 26% linoleic (18:2 n-6) |
| | 2% stearic (18:0) | 56% oleic (18:1 n-9) |
| | | 10% linolenic (18:3 n-3) |
| Olive Oil | 12% saturated | 86% unsaturated |
| | 10% palmitic acid (16:0) | 7% linoleic (18:2 n-6) |
| | 2% stearic (18:0) | 78% oleic (18:1 n-9) |
| | | 1% linolenic (18:3 n-3) |
| Corn Oil | 16% saturated | 84% unsaturated |
| | 13% palmitic acid (16:0) | 52% linoleic (18:2 n-6) |
| | 3% stearic (18:0) | 31% oleic (18:1 n-9) |
| | | 1% linolenic (18:3 n-3) |
| Safflower Oil | 10% saturated | 89% unsaturated |
| | 7% palmitic acid (16:0) | 75% linoleic (18:2 n-6) |
| | 3% stearic (18:0) | 14% oleic (18:1 n-9) |
| Palm Oil | 48% saturated | 50% unsaturated |
| | 44% palmitic acid (16:0) | 10% linoleic (18:2 n-6) |
| | 4% stearic (18:0) | 40% oleic (18:1 n-9) |
| Coconut Oil | 90% saturated | 9% unsaturated |
| | 9% palmitic acid (16:0) | 2% linoleic (18:2 n-6) |
| | 2% stearic (18:0) | 7% oleic (18:1 n-9) |
| | 48% lauric (12:0) | |
| | 16% myristic (14:0) | |
| | 8% caprylic (8:0) | |
| | 7% capric (10:0) | |

In Table 1, the total of saturated and unsaturated may not add up to 100%, because such vegetable oils also sometimes include small fractions of components other than the principal components listed. For example, for soybean oil, the totals above account for 95%, such that the other 5% may comprise other components naturally within native soybean oil. For canola oil, the totals account for 98%, such that the other 2% may comprise other components naturally within native canola oil.

The parentheticals following each fatty acid component indicate the number of carbons in the fatty acid carbon chain, how many double bonds (if any double bonds are present), and the location of the start of the first double bond counting from the methyl end of the chain. For example, linolenic includes 18 carbons, with 3 C═C double bonds, and the first of these is at the third carbon atom from the chain end.

The vegetable oil included in the present food composition is thus preferably not engineered to decrease the fraction of triglycerides while increasing diglyceride and/or monoglyceride content (as in U.S. Pat. No. 7,468,395), or engineered in another way, but is used in its native, naturally sourced form, without separating the fatty acid chains from the triglyceride backbone, or reforming different glycerides through re-esterification.

It is surprising that such relatively high levels of liquid vegetable oil triglycerides (i.e., triglyceride vegetable oils that are liquid at ambient temperature) can be incorporated into an aerated acidified food composition, that would be stable at room temperature. The current state of the art includes little or no such oil, or only includes such lipid components where they are solid fats (solid at ambient temperature). It was considered heretofore difficult, if not impossible as a practical matter to incorporate high fractions of liquid vegetable oils in their native form, and achieve desirable results (e.g., good taste, density no greater than 0.8 g/cm$^3$, such as 0.4 g/cm$^3$ to 0.8 g/cm$^3$, ambient temperature shelf-stability, and the like).

In an embodiment, at least 50% of the triglyceride oils included in the vegetable oil (whether just sourced from one vegetable or comprising a mixture of vegetable oils) may be unsaturated. As such, highly unsaturated oils, such as soybean oil and canola oil may be preferred. In some embodiments, at least 50%, at least 60%, at least 70%, or at least 80% of the triglyceride oil(s) may be unsaturated.

In addition to the oil, particularly where the oil is emulsified with water, an emulsifier may also be present. Examples of such emulsifiers include, but are not limited to egg, egg yolk, egg white, lecithin, mustard seed, monoglycerides, diglycerides, polysorbate, and the like. Various other emulsifiers will be apparent those of skill in the art. The amount of the emulsifier included in the composition as a whole may be less than 10% by weight, less than 5% by weight, less than 4% by weight, less than 2% by weight, from 1% to 5%, or from 1% to 3% by weight.

The acidic pH of the finished aerated food product composition can be provided by including a food grade acid with the oil and water emulsion. As described above, it is important that the concentrated acid not be added directly to the aerated composition, as the acid has been found to interfere with the ability to make and/or maintain good aeration (i.e., it causes the desired foamed, whipped texture to collapse). For this reason, the acid is added later, in diluted form.

As noted above, the amount of the food grade acid included in the composition as a whole may typically be from 1% to 3% by weight.

The food product may be a dip, a dressing, a sauce, a cream, a spread, or other topping intended to be stored at room temperature prior to opening of the package. The food product may be served and consumed at room temperature, or if desired, it may be possible to chill, or even heat the composition at the time of consumption. The composition is stable at room temperature, maintaining freshness and its aerated texture (e.g., it will not melt and collapse, like ice-cream or the like).

The food product may have a cross-over strain (G'=G") of at least 50%, or at least 55% (e.g., as measured by oscillatory amplitude sweep conducted using a 5 mm gap on a parallel plate).

Additional components may also be included, e.g., so as to provide a desired flavor or the like. Examples of such other components include, but are not limited to flavors (buttermilk and the like), spices, milk solids, starch, sugar, salt, and the like, depending on the particular type of dip, dressing, topping, or other packaged food product. Many of such components included within the dip, dressing, or other topping may be according to traditionally employed, existing non-aerated dip, dressing, or other food product formulations, and the identity and parameters of many of such will be appreciated by those of skill in the art. In at least some embodiments, the food product formulation may be a dairy-based dip (e.g., Ranch dip).

All else being equal, increased water content may increase the potential for microbiological activity, increasing risk that the composition may not be shelf-stable. In other words, with relatively high water content, such as that provided in the present food product compositions, it is surprising that microbes naturally present within the composition do not multiply exponentially, leading to spoilage within a short period of time, without refrigeration. It will be apparent that altering the oil/water ratio may be paired with adjustments to any preservative system included in the composition. Altering the oil/water ratio may also affect the rheology characteristics of the product, affecting texture and similar characteristics, with increased oil content typically correlating to increased thickness and viscosity. The oil/water ratio may also affect the "mouth feel" of the product.

An antimicrobial inhibitor (i.e., preservative) may be included, including, but not limited to a benzoate, sorbate, sorbic acid, or combinations thereof. Specific examples include, but are not limited to sorbic acid, sodium benzoate, potassium benzoate, potassium sorbate, nisin and natamycin or the like. Natural antimicrobial inhibitors (e.g., nisin and natamycin) may be preferred.

Such components may be included at levels employed in other shelf-stable, non-aerated food products. Microstability may be evaluated by inoculating the food product with lactic acid bacteria, yeast, mold, or other desired pathogenic microorganisms within 1-2 hours of product manufacture. The micro-inoculum may be mixed just once during the study, to minimize destruction to the aerated texture. Such testing may serve to determine if any of the microbes are being protected within the air pockets, or oil pockets, where they may undesirably multiply. Another method of microstabilility evaluation may involve adding the microbes to the composition before aeration.

In order to further increase the stability of the aerated texture of the food product, a Pickering stabilizer may be included, having wetting properties and a particle size(s) configured to provide a Pickering stabilization mechanism, or Pickering emulsion. Such particles may adsorb onto the interphase between the gas bubbles (e.g., nitrogen or air), forming a rigid shell, capable of stabilizing the thin film provided by the protein in the aerated composition. Such particles may be sized (e.g., from 5 to 20 nm (e.g., 10 nm)), and become essentially irreversibly adsorbed. Irreversible adsorption of such particles may form a shell capable of stabilizing the bubbles. This may provide improved stabilization against coalescence and/or disproportionation of the gas bubbles over time. Cellulose particles may be an example of such a Pickering stabilizer.

Any of various suitable structures may be used to mix the various components of the composition. For example, those available from Mondo Mixer, Breddo, and/or Hobart may be suitable for use. The particular structure employed for such mixing is not particularly limited, and a wide variety of structures will be apparent to those of skill in the art, in light of the present disclosure.

D. Other Components

In addition to the above described components provided in the dip or other food product composition, various other components may be provided as would be typical in providing desired flavor and other characteristics.

Salt (sodium chloride) may be included, typically up to about 3% by weight. Of course, relatively more or less salt may be included to achieve a specific flavor.

A sweetener, such as sugar, corn syrup, or other sweeteners may be added to a dip or other aerated food product to provide a sweet flavor, to decrease the perceived tartness of the dip, or both. Of course, where a "clean" label is desired, it may be advantageous to avoid inclusion of high fructose corn syrup, other corn syrup, or other highly processed sweeteners. In such embodiments, if any sweetener is present, sugar or a non-nutritive sweetener (e.g., any of the various sugar alcohols) may be employed. Combinations of sweeteners may of course be employed. In some embodiments, the amount of such sweetener may be less than 15%, less than 10%, less than 5%, or less than 4%, by weight of the composition.

"Miscellaneous" ingredients may include edible ingredients, such as those added principally for flavor, or for other purposes, and may depend on the specific flavor of dip or other food product being formulated. Examples include, but are not limited to savory flavors (e.g., hydrolyzed vegetable protein, inosinates and guanylates); meat and meat flavors (e.g., bacon, bacon flavor); dairy and/or egg products (e.g., buttermilk, sour cream, blue cheese, whole egg), both liquid and dehydrated; vegetables and vegetable flavors (e.g., bell pepper, pickles, onion), fresh or dehydrated; fruits (e.g., fresh or dehydrated), herbs and spices (e.g., pepper, parsley, dill, thyme, sage, oregano), either fresh or dehydrated; natural or artificial flavors; extracts; and/or other edible additives included to alter taste or to provide some other particular characteristic.

While MSG is often included in many existing food products as a flavor enhancement, in at least some embodiments, in order to improve the cleanliness of the label, no MSG may be included. While MSG can serve as a flavor enhancer, or provide other function, inclusion of MSG is problematic to some consumers, so that its absence may be helpful.

In order to aid in maintaining the desired acidic pH, a buffer may be present in the formulation, if desired. While sodium containing buffers may be technically suitable for use, in some embodiments, any included buffer is not a sodium salt, so as to decrease the content of sodium containing components within the composition, to increase the appeal of the labeling. For example, salts of magnesium, potassium and particularly calcium may be more preferred. Such buffers may be carbonates, bicarbonates, hydrates thereof, and the like.

IV. EXAMPLES

Example 1

An aerated acidified food product composition was prepared by mixing together the components shown below in Table 2.

TABLE 2

| Component | Wt. Percent |
|---|---|
| Sugar | 4% |
| Glucose Syrup | 1% |
| Salt | 2.5% |
| Hydrocolloids (gums and starch) | 1.5% |

TABLE 2-continued

| Component | Wt. Percent |
| --- | --- |
| Preservatives | 0.003% |
| Dairy Protein (Whey) | 0.5% |
| Flavors and Spices | 5.5% |
| Egg Yolk | 1% |
| Mono and Diglycerides | 0.5% |
| Citric Acid (anhydrous) | 1% |
| White Distilled Vinegar 300 Grain | 1% |
| Soybean Oil | 30% |
| Palm Kernel Oil | 1% |
| Water | 50.5% |

Example 2

An aerated acidified food product composition was prepared by mixing together the components shown below in Table 3 and employed a soy protein and cyclodextrin stabilizer, rather than the dairy protein and mono- and diglyceride stabilizer of Example 1.

TABLE 3

| Component | Wt. Percent |
| --- | --- |
| Sugar | 4% |
| Salt | 2.5% |
| Hydrocolloids (gums, starch, alginate) | 2% |
| Preservatives | 0.003% |
| Enzyme-modified Soy Protein | 2.5% |
| Flavors and Spices | 5.5% |
| Egg Yolk | 1% |
| α-cyclodextrin | 2.5% |
| Citric Acid (anhydrous) | 1% |
| White Distilled Vinegar 300 Grain | 1% |
| Soybean Oil | 30% |
| Water | 48% |

Example 3

An aerated acidified food product composition was prepared by mixing together the components shown below in Table 4.

TABLE 4

| Component | Wt. Percent |
| --- | --- |
| Sugar | 2.5% |
| Salt | 1.2% |
| Hydrocolloids (xanthan and guar gums, starch) | 1% |
| Preservatives | 0.003% |
| Enzyme-modified Soy Protein | 1.8% |
| Flavors and Spices | 5.5% |
| Egg Yolk | 3.5% |
| α-cyclodextrin | 1.8% |
| Citric Acid (anhydrous) | 1% |
| White Distilled Vinegar 300 Grain | 1% |
| Soybean Oil | 45% |
| Water | 35.7% |

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

The invention claimed is:

1. A shelf-stable acidified aerated food product composition comprising:
   (a) isolated whey or modified soy protein, present in an amount of 0.2% to less than 5% by weight;
   (b) a stabilizer for stabilizing the isolated protein, the stabilizer being present in an amount of 0.2% to less than 5% by weight, wherein where the protein is modified soy protein, the stabilizer comprises cyclodextrin, and where the protein is whey protein the stabilizer comprises an ester of mono/di glyceride fatty acids;
   (c) oil, where the oil comprises a naturally sourced triglyceride oil which has not been synthetically esterified, which oil is liquid at ambient temperature, the composition comprising at least 30% oil, and the composition is substantially devoid of solid fats having a melting temperature greater than ambient temperature;
   (d) a hydrocolloid;
   (e) water; and
   (f) a food grade acid, wherein the composition has a pH of less than 4;
   wherein the food product composition has a density of not more than 0.8 g/cm$^3$, and wherein the food product composition is shelf-stable without hot-packing for a period of at least 1 month without refrigeration.

2. The food product composition of claim 1, wherein the protein comprises whey protein, and the stabilizer comprises an ester of mono/di glyceride fatty acids.

3. The food product composition of claim 1, wherein the protein comprises soy protein, and the stabilizer comprises cyclodextrin.

4. The food product composition of claim 1, wherein the oil comprises an unsaturated oil.

5. The food product composition of claim 1, wherein the oil comprises at least one of soybean oil, safflower oil, canola oil, corn oil, olive oil, sesame oil, cottonseed oil, flaxseed oil, sunflower oil, or peanut oil.

6. The food product composition of claim 1, further comprising an emulsifier that comprises one or more of egg, egg yolk, egg white, lecithin, a monoglyceride, a diglyceride, a polysorbate, or mustard seed.

7. The food product composition of claim 1, wherein the food grade acid comprises one or more of phosphoric acid, citric acid, acetic acid, malic acid, gluconic acid, lactic acid, fumaric acid, propionic acid, succinic acid, tartaric acid, glucono delta lactone, or hydrochloric acid.

8. The food product composition of claim 1, wherein the food composition is shelf-stable for a period of at least 6 months without refrigeration.

9. The food product composition of claim 1, wherein the shelf-stable acidified aerated food composition has a density from 0.4 g/cm$^3$ to 0.8 g/cm$^3$.

10. The food product composition of claim 1, wherein the composition further comprises at least one of a gum or starch.

11. The food product composition of claim 1, wherein the composition has a viscosity of at least 1.000 cps.

12. A shelf-stable acidified aerated food product composition comprising:
   (a) a protein that is isolated whey protein or modified soy protein, present in an amount of 0.2% to less than 5% by weight;
   (b) a stabilizer for stabilizing the isolated whey or soy protein, the stabilizer being present in an amount of 0.2% to less than 5% by weight, wherein where the protein is modified soy protein, the stabilizer comprises cyclodextrin, and where the protein is whey protein the stabilizer comprises an ester of mono/di glyceride fatty acids;

(c) water;
(d) a hydrocolloid;
(e) oil, which oil is liquid at ambient temperature, the composition comprising at least 30% oil, and the composition is substantially devoid of solid fats having a melting temperature greater than ambient temperature; and
(f) a food grade acid;
wherein the shelf-stable acidified aerated food product composition has a density of not more than 0.8 g/cm$^3$ and a pH of less than 4;
wherein the food product composition is shelf-stable without hot-packing for a period of at least 1 month without refrigeration; and
wherein any sweetener is present at less than 15% by weight.

13. The food product composition of claim 12, where the oil comprises a naturally sourced triglyceride oil which has not been synthetically esterified.

14. The food product composition of claim 12, wherein: the hydrocolloid comprises at least one of xanthan gum, guar gum, carrageenan, agar, locust bean gum, cellulose, alginate, or corn starch.

15. The food product composition of claim 12, wherein the oil comprises at least one of soybean oil, safflower oil, canola oil, corn oil, olive oil, sesame oil, cottonseed oil, flaxseed oil, sunflower oil, or peanut oil.

16. The food product composition of claim 2, wherein the ester of mono/di glyceride fatty acids is present in an amount of no more than 1% by weight.

* * * * *